United States Patent [19]

Yamasaki et al.

[11] Patent Number: 4,864,359
[45] Date of Patent: Sep. 5, 1989

[54] SCANNING EXPOSURE DEVICE

[76] Inventors: Teiichi Yamasaki; Kiyoji Nakamura, both of c/o Fuji Micrographics Co., Ltd., No. 1005, Kosono, Ayase-shi, Kanagawa-ken, Japan

[21] Appl. No.: 165,959

[22] Filed: Mar. 9, 1988

[30] Foreign Application Priority Data

Mar. 10, 1987 [JP] Japan .................. 62-53120

[51] Int. Cl.[4] .............. G03B 27/48; G03B 27/50; G03B 27/70
[52] U.S. Cl. ........................ 355/51; 355/45; 355/233; 355/57; 355/60; 355/65; 355/235
[58] Field of Search .............. 355/5, 8, 11, 43, 45, 355/51, 57, 60, 65, 66

[56] References Cited

U.S. PATENT DOCUMENTS

| | | | |
|---|---|---|---|
| 3,535,038 | 10/1970 | Stieuenart et al. | 355/66 |
| 3,649,126 | 3/1972 | Koizumi | 355/65 |
| 3,907,418 | 9/1975 | Okuyama | 355/5 X |
| 4,084,212 | 4/1978 | Tiger | 361/230 |
| 4,181,424 | 1/1980 | Okada et al. | 355/8 |
| 4,212,532 | 7/1980 | Suzuki | 355/8 X |
| 4,278,346 | 7/1981 | Toriumi et al. | 355/45 |
| 4,464,046 | 8/1984 | Kanazawa et al. | 355/57 |

FOREIGN PATENT DOCUMENTS 60-128345 8/1985 Japan .

Primary Examiner—Richard A. Wintercorn

[57] ABSTRACT

A scanning exposure device comprises a projection lens, a photosensitive member disposed beneath the projection lens, two movable mirrors disposed with their reflecting surfaces facing upward and having asymmetrical inclinations relative to each other, and a stationary mirror disposed with its reflecting surface facing downward to form an optical path together with the movable mirrors. The two movable mirrors are driven for scanning movements so as to expose a picture image from the projection lens on the photosensitive member through a slit. Thus, an optical path is established in which the light beam projected from the projection lens located at a higher position is guided toward the photosensitive member located at a lower position.

4 Claims, 4 Drawing Sheets

SCANNING EXPOSURE DEVICE

DESCRIPTION OF THE INVENTION

1. Field Of The Invention

This invention relates to a scanning exposure device which is used with an apparatus such as a reader printer or an electronic copying apparatus having an optical system arranged to expose a picture image onto a photosensitive member through a slit.

2. Background Of The Invention

A reader printer is an apparatus in which desired picture image information recorded on microfiche film can be projected on a screen to be observed, and, when so required, this image can be exposed onto a photosensitive member to be copied. Known types of this reader printer include a total exposure type and a slit exposure type. In the total exposure type, a picture image is exposed as a whole at one time onto a photosensitive member to obtain its copy. On the other hand, in the slit exposure type, a pair of movable mirrors disposed between a projection lens and a photosensitive member are driven in scanning movements, and a picture image projected by the projection lens is exposed on the photosensitive member through a slit. Reader printers of the total exposure type are disclosed in, for example, U.S. Pat. Nos. 3,907,418 and 4,084,212, while those of the slit exposure type are disclosed in, for example, U.S. Pat. No. 4,278,346 and Japanese Utility Model Laid-Open (published) Application No. 60-128345.

The form of the scanning optical system of the scanning exposure device used in the prior art reader printer of the slit exposure type has been substantially limited. That is, a picture image has been first projected upward by the projection lens, and the direction of this light beam has then been changed to the downward direction by the light reflection by the movable mirror pair so as to expose the picture image on the photosensitive member. Thus, the optical path of the scanning optical system has been substantially in the form of a "U" in the prior art scanning exposure device. The optical path has been limited to the above form for the reasons which will be described now.

A conventional microfiche is in the form of a planar strip having many picture image information recorded in a grid-like pattern. Therefore, projection of a picture image recorded on such a microfiche placed on a horizontal support is preferable to ensure positional accuracy, and the light beam from the projection lens is directed upwards or downwards. On the other hand, when the manipulation capability of the reader printer is considered, the microfiche and the screen must be set at positions having certain heights from the floor surface on which the reader printer is installed. Therefore, the photosensitive member must be disposed at a position beneath the set position of the microfiche. Because of the various requirements described above, the prior art scanning exposure device has had a substantially U-like optical path as described above.

SUMMARY OF THE INVENTION

With a view to eliminate the prior art limitations as pointed out above, it is an object of the present invention to provide a scanning exposure device in which an optical path of a novel form improved over the prior art is provided to increase the degree of freedom of designing a reader printer, an electronic copying apparatus or the like.

The scanning exposure device according to the present invention includes a projection lens and a photosensitive member disposed beneath the projection lens. A first movable mirror has its reflecting surface facing upwardly to reflect a light beam projected from the projection lens. A second movable mirror has its reflecting surface facing upwardly and having an asymmetrical inclination relative to that of the first movable mirror to reflect the light beam reflected from the first movable mirror. A stationary mirror has its reflecting surface facing downwardly to reflect the light beam reflected from the second movable mirror. The combination of the first and second movable mirrors and the stationary mirror successively form an optical path extending between the projection lens and the photosensitive member. Other means cause scanning movements of the first and second movable mirrors so that a picture image projected by the projection lens is exposed on the photosensitive member through a slit.

According to the scanning exposure device of the present invention, the two movable mirrors having their reflecting surfaces facing upwardly and having asymmetrical inclinations relative to each other are combined with the stationary mirror having its reflecting surface facing downwardly, thereby increasing the degree of freedom of designing a reader printer, an electronic copying apparatus and the like, so that the size and cost of these apparatus can be decreased. Especially, the scanning exposure device of the present invention can realize an optical path advantageous from the aspect of design when applied to a reader printer using a cassette type microfiche film as shown later in FIG. 2.

DETAILED DESCRIPTION OF THE PREFERRED EMBODIMENTS

Preferred embodiments of the present invention will now be described in detail with reference to the drawings.

Figure 1:
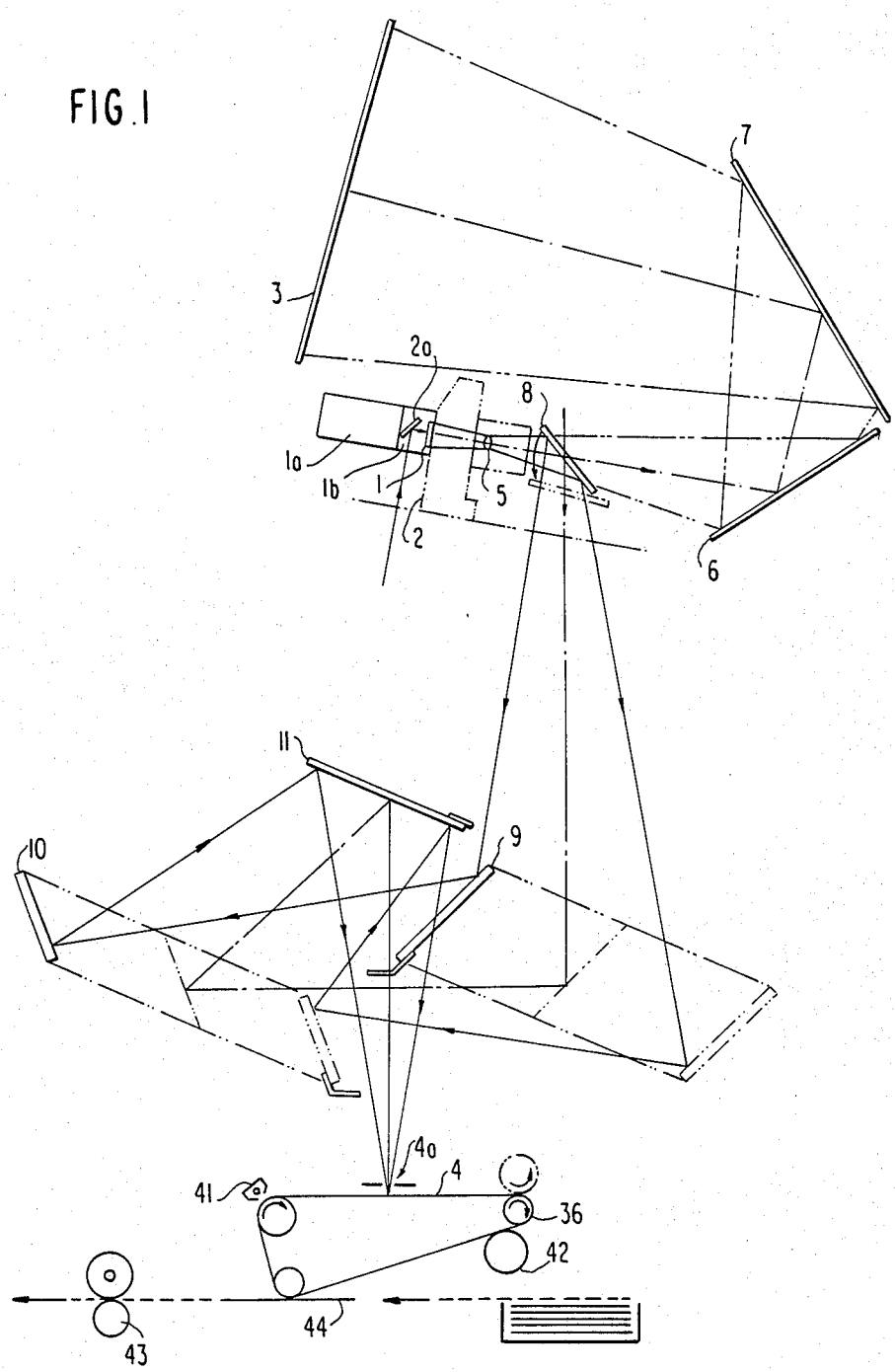
FIG. 1 shows diagrammatically the structure of an embodiment of the scanning exposure device according to the present invention.
Figure 2:
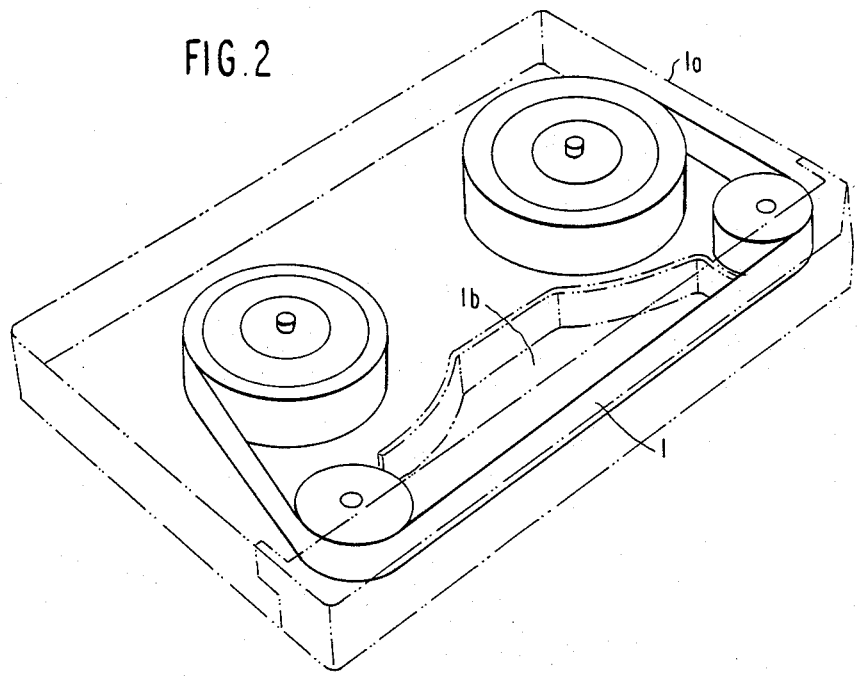
FIG. 2 is a perspective view of a microfiche film cassette.
Figure 3:
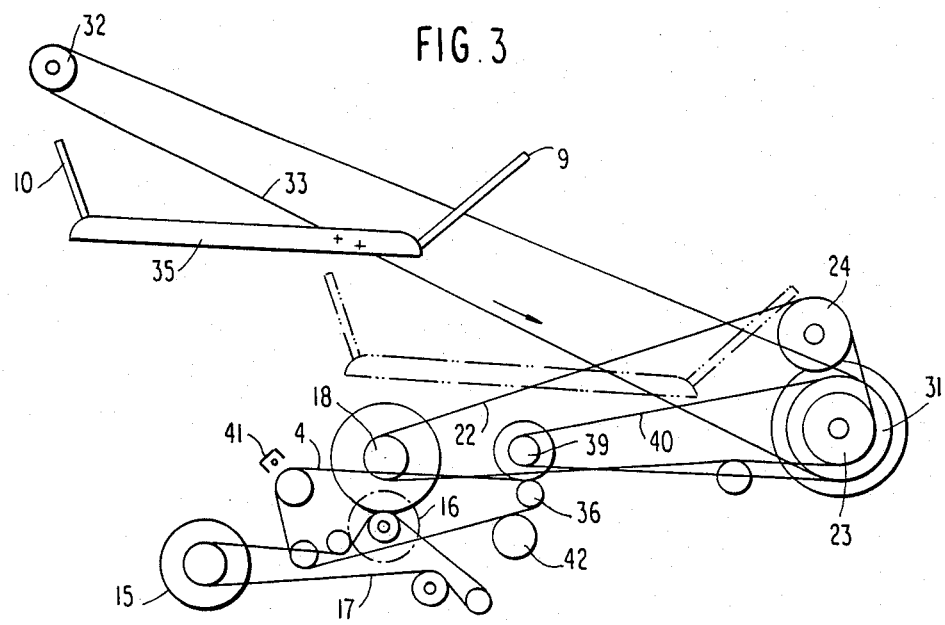
FIG. 3 is a diagrammatic front elevation view showing in detail the structure of the drive mechanism in the exposure device shown in FIG. 1.
Figure 4:
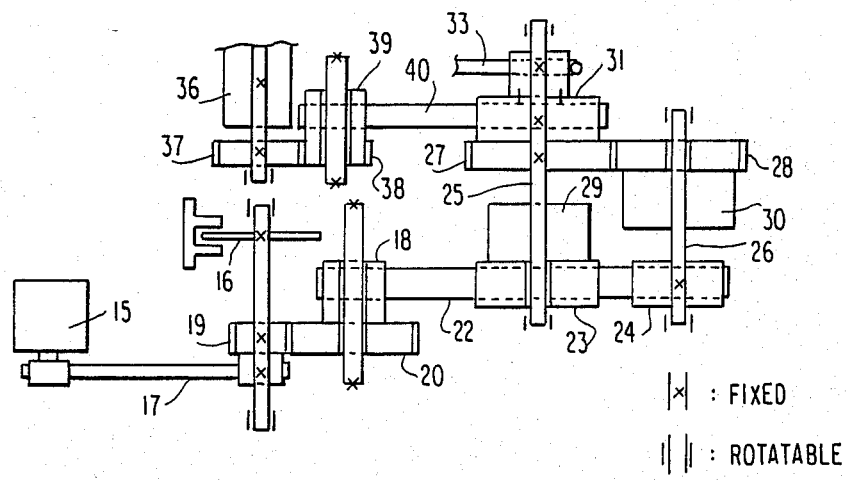
FIG. 4 is a diagrammatic plan view or the drive mechanism shown in FIG. 3.

FIG. 1 shows diagrammatically the structure of an embodiment of the scanning exposure device of the present invention when applied to a reader printer. FIG. 2 is a perspective view of a microfiche film cassette used in the reader printer. FIG. 3 is a diagrammatic front elevation view showing in detail the structure of the drive mechanism in the scanning exposure device shown in FIG. 1. FIG. 4 is a diagrammatic view of the drive mechanism shown in FIG. 3.

Referring to FIG. 1, in the reader printer to which the embodiment of the present invention is applied, a screen 3 is disposed above a loading holder 2 for loading a microfiche film 1. A photosensitive member 4 is disposed beneath the microfiche film loading holder 2. A projection lens 5 is mounted on the microfiche film loading holder 2, and a light beam from this projection lens 5 is changed over depending on a screen projection mode and a copying mode. In the screen mode, the light beam from the projection lens 5 passes along an optical path formed by mirrors 6 and 7. In this mode, picture image information recorded on the microfiche film 1 is projected on the screen 3. On the other hand, in the copying mode, the light beam from the projection lens 5 passes along an optical path formed by an optical-path change-over mirror 8, a first movable mirror 9, a second movable mirror 10 and a stationary mirror 11. In this mode, picture image information recorded on the microfiche film 1 is exposed onto the photosensitive member 4. That is, the operation mode can be changed over between the screen projection mode and the copying mode by vertically moving the optical-path change-over mirror 8 between the position shown by the solid lines and that shown by the chain lines in FIG. 1. The microfiche film 1 used in the embodiment of the present invention is in the form of a long web or belt unlike conventional ones and is stored in a wound state around reels in a cassette 1a shown in FIG. 2. Therefore, the cassette 1a containing the microfiche film 1 is loaded in the loading holder. Light from a light source (not shown) is directed toward the microfiche film 1 through a mirror 2a inserted in an opening 1b of the cassette 1a when the cassette 1a is loaded.

The first movable mirror 9 and the second movable mirror 10 are disposed with their reflecting surfaces facing partially upwards and having asymmetrical inclinations relative to each other. On the other hand, the stationary mirror 11 is disposed with its reflecting surface facing downwards and having an inclination roughly corresponding to that of the second movable mirror 10. By so selecting the asymmetrical inclinations of the first and second movable mirrors 9 and 10, the setting of the position of the stationary mirror 11 on the optical path is facilitated. Thus, when the mirrors 9, 10 and 11 are disposed in the relations described above, the light beam projected from the projection lens 5 and then reflected by the optical-path change-over mirror 8 passes along the optical path in which the light beam is successively reflected by the first movable mirror 9, the second movable mirror 10 and the stationary mirror 11 and is finally directed toward the photosensitive member 4 located beneath the projection lens 5. In order that the light beam from the projection lens 5 can be exposed through a slit 4a onto the photosensitive member 4, the first and second movable mirrors 9 and 10 are now shifted toward the positions shown by the chain lines in FIG. 1, and such scanning movements of these mirrors 9 and 10 are achieved by a drive mechanism as shown in FIGS. 3 and 4.

Referring to FIGS. 3 and 4, a drive motor 15 is connected to an encoder 16 by a belt 17, and the encoder 16 is connected to a pulley 18 through gears 19 and 20. The pulley 18, which is integral with the gear 20, is connected to pulleys 23 and 24 by a belt 22. The pulley 23 is freely rotatably mounted on a rotary shaft 25, while the pulley 24 is fixedly mounted on the rotary shaft 26. A gear 27 fixedly mounted on the rotary shaft 25 meshes with a gear 28 freely rotatably mounted on the rotary shaft 26. The pulley 23 and the gear 28 are provided with electromagnetic clutches 29 and 30 respectively. Therefore, the drive force from the drive motor 15 is transmitted to the pulley 23 and rotary shaft 26 through the belt 17, gears 19 and 20, pulley 18 and belt 22. The rotary shaft 25 can be rotated in one direction and in the opposite direction when the electromagnetic clutches 29 and 30 are selectively energized to fix the pulley 23 to the rotary shaft 25 and to fix the gear 28 to the rotary shaft 26, respectively. A stepped pulley 31 is fixedly mounted on the rotary shaft 25, and a wire 33 is wound under tension between this stepped pulley 31 and a pulley 32. A carriage 35 secured to the wire 33 supports the first and second movable mirrors 9 and 10 so that these mirrors 9 and 10 can be moved in a unitary relation. Therefore, when the rotary shaft 25 is rotated in one direction and the other by selectively energizing or engaging the clutches 29 and 30, the first and second movable mirrors 9 and 10 can be reciprocally moved, in synchronism with the movement of the photosensitive member 4, between their positions shown by the solid lines and their positions shown by the chain lines in FIG. 3. Thus, the light beam from the projection lens 5 can expose a picture image on the photosensitive member 4 through a slit 4a by causing the scanning movements of the first and second movable mirrors 9 and 10 in the direction shown by the arrow in FIG. 3. This direction is determined by the relation between the individual optical members.

The photosensitive member 4 used in the embodiment of the present invention is in the form of a belt as described already. A drive roller 36 having part of this photosensitive member 4 wound therearound is connected to the stepped pulley 31 through gears 37 and 38, a pulley 39 and a belt 40, so that the photosensitive member 4 is also moved in synchronism with the movements of the first and second movable mirrors 9 and 10. A charging unit 41, a developing unit 42, a fixing unit 43, etc. are associated with the photosensitive member 4, so that picture image information exposed on the photosensitive member 4 can be toner-developed, transfer-printed onto a copying sheet 44 and then fixed.

In the aforementioned embodiment, the first and second movable mirrors 9 and 10 are arranged to be driven as a unit for scanning movements. In another embodiment shown in FIGS. 5, 6 and 7, the first and second movable mirrors 9 and 10 are driven at different scanning speeds so that these mirrors 9 and 10 need not have a large angle of view. In this second embodiment which is a modification of the first embodiment, the same reference numerals are used to designate the same parts incorporated in the first embodiment to dispense with repetition of the explanation of such parts.

Figure 5:
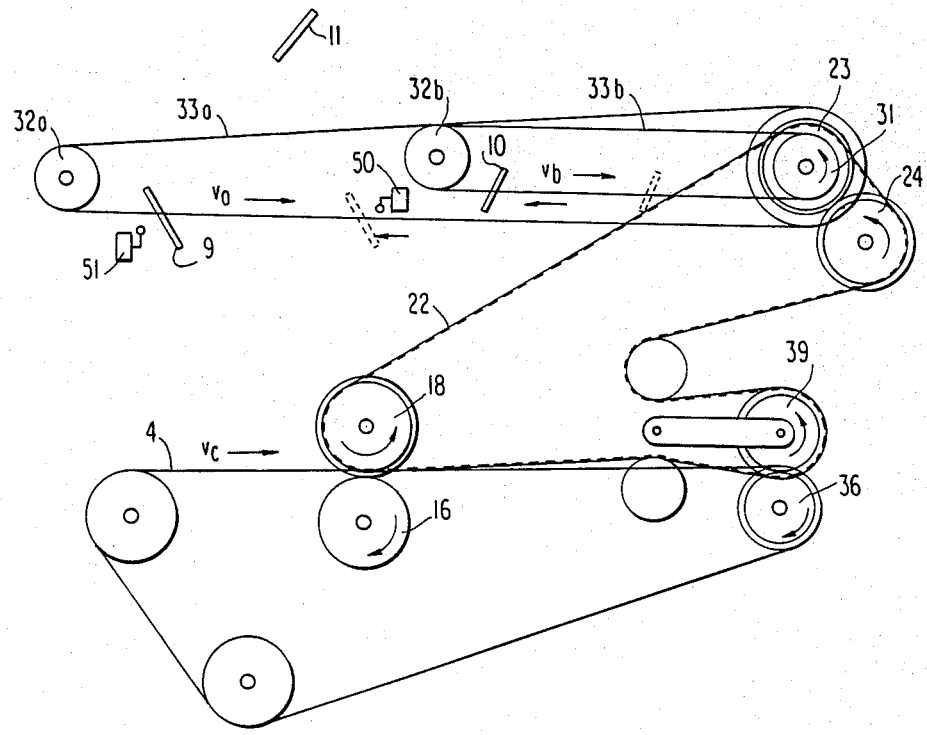
FIG. 5 is a diagrammatic front elevation view showing the structure of a drive mechanism in another embodiment of scanning exposure device of the present invention.
Figure 6:
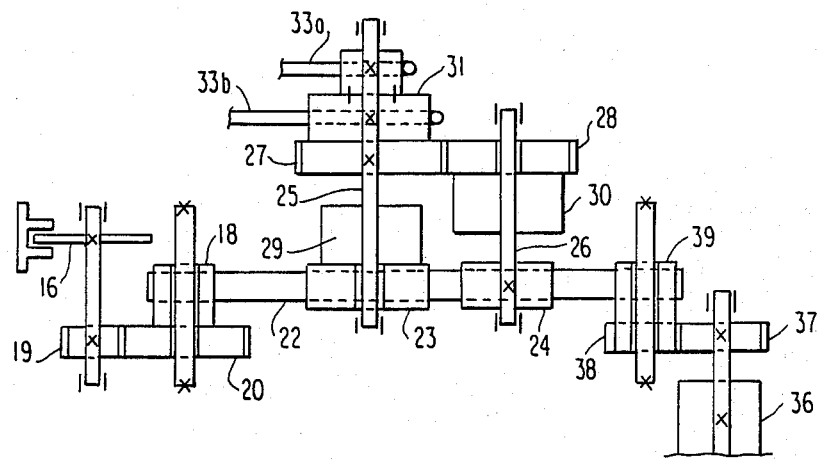
FIG. 6 is a diagrammatic plan view of the drive mechanism shown in FIG. 5.

Referring to FIGS. 5 and 6 showing a scanning drive mechanism of this second embodiment, a first wire 33a, to which the first movable mirror 9 is secured, is wound between a pulley 32a and a large diameter portion of the stepped pulley 31. On the other hand, a second wire 33b, to which the second movable mirror 10 is secured, is wound between a pulley 32b and a small diameter portion of the stepped pulley 31. Because of the difference between the diameters of the large and small diameter portions of the stepped pulley 31, there is a difference between the scanning speed $V_a$ of the first movable mirror 9 and that $V_b$ of the second movable mirror 10. Limit switches 50 and 51 shown in FIG. 5 detect the extreme ends of the scanning movement of the first movable mirror 9 thereby generating output signals for controlling the operation of the electromagnetic clutches 29 and 30, respectively. In this second embodiment, the belt 22 is also partly wound around a pulley 39 which transmits the drive force to the photosensitive member 4. Thus, the drive system driving the photosensitive member 4 differs from that used in the first embodiment. Further, in the second embodiment, the attitudes of the first and second movable mirrors 9 and 10 are reversed from those in the first embodiment. That is, the first and second movable mirrors 9 and 10 are inclined respectively leftwardly and rightwardly, in FIG. 5. Also, the attitude of the stationary mirror 11 is reversed, and the stationary mirror 11 is inclined rightwardly.

Figure 7:
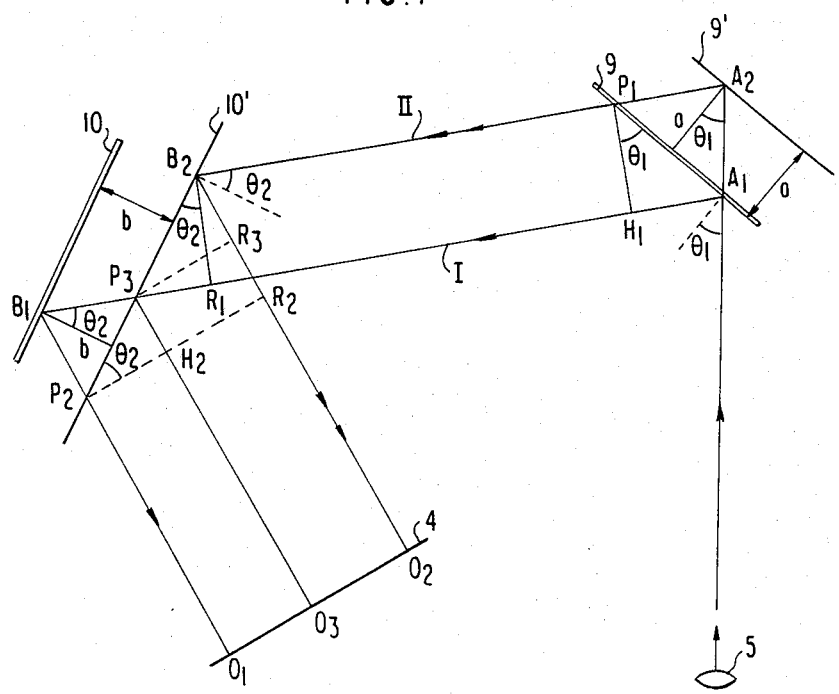
FIG. 7 is a diagram illustrating the movements of the movable mirrors relative to the photosensitive member.

How the scanning speeds $V_a$ and $V_b$ of the respective movable mirrors 9 and 10 should be determined relative to the moving speed $V_c$ of the photosensitive member 4 will be discussed with reference to FIG. 7 showing the movement of the photosensitive member 4 relative t those of the first and second movable mirrors 9 and 10.

Referring to FIG. 7, a main light beam from the projection lens 5 is incident upon the first movable mirror 9 at an angle of incidence $\Theta_1$ and is reflected. The reflected light beam passes along an optical path on the same plane and is incident upon the second movable mirror 10 at an angle of incidence $\Theta_2$. The light beam reflected from the second movable mirror 10 is focused on the photosensitive member 4 to form a picture image thereon. The relation between the moving speed $V_c$ of the photosensitive member 4 and the scanning speeds $V_a$ and $V_b$ of the movable mirrors 9 and 10 in order to move the image in synchronism with the moving speed $V_c$ of the photosensitive member 4 is given by:

$$V_c = 2V_a \cos\theta_1 (\tan\theta_1 + \tan\theta_2) \qquad (1)$$
$$= 2V_b \cos\theta_2 (\tan\theta_1 + \tan\theta_2)$$

Suppose that the first movable mirror 9 is displaced by a distance a along its normal direction in reaching a new position 9' and that the second movable mirror 10 is displaced by a distance b along its normal direction to reach a new position 10'. Optical path lengths I and II corresponding to the positions 9, 10 and 9', 10' respectively of the movable mirrors 9 and 10 are expressed as follows when common path lengths are eliminated:

$$I = 2a\tan\theta_1 \sin\theta_1 + 2b/\cos\theta_2 \qquad (2)$$
$$II = 2b\tan\theta_2 \sin\theta_2 + 2a/\cos\theta_1$$

The relation between path lengths of I = II should hold in order that the image can be maintained in sharp focus in spite of such displacements of the movable mirrors 9 and 10, and the following relation:

$$a/b = \cos\Theta_2/\cos\Theta_1 \qquad (3)$$

is derived from equations (2).

On the other hand, because the position of the main light beam spot on the photosensitive member 4 is displaced from a point $O_1$ to a point $O_2$ as a result of the displacements of the movable mirrors 9 and 10, the displacement of the beam spot from the point 1 to the point $O_2$ is required to be synchronized with the movement of the photosensitive member 4 in order that the picture image can be sharply focused on the photosensitive member 4. The displacement of the optical path I to the optical path II due to the displacement of the first movable mirror 9 is $P_1H_1(P_lH_l = P_3R_3 = H_2R_2)$. The displacement of the optical path due to the displacement of the second mirror 10 is $P_2H_2$. The value of the distance $0_1 0_2$ should be:

$$O_1 O_2 = P_1H_2 + P_2H_2 \qquad (4)$$
$$= H_2R_2 + P_2H_2$$

in order that the point $O_1$ can be displaced to the point $O_3$ in synchronism with the movement of the photosensitive member 4. In equation (4), $$P_1H_1 = P_1A_1\cos\theta_1$$
$$= 2a\tan\theta_1 \cdot \cos\theta_1 = H_2R_2$$

$$P_2H_2 = P_2P_3\cos\theta_2$$
$$= 2b\tan\theta_2 \cdot \cos\theta_2$$

Therefore, $O_1 O_2$ is expressed as $$O_1 O_2 = 2a\tan\Theta_1 \cos\Theta_1 + 2b\tan\Theta_2 \cos\Theta_2 \qquad (5)$$

Equation (5) is rewritten as $$O_1 O_2 = 2a\cos\theta_1(\tan\theta_1 + \tan\theta_2)$$
$$= 2b\cos\theta_2(\tan\theta_1 + \tan\theta_2)$$

because there is the relation expressed by equation (3) between the displacement a and b of the movable mirrors 9 and 10 and the angles of incidences $\Theta_1$ and $\Theta_2$.

Thus, the displacement of the point $O_1$ to the point $O_2$ and the displacements of the mirrors 9 and 10 occur within a predetermined period of time at the speeds $V_c$, $V_a$ and $V_b$ (where $V_a$ and $V_b$ are the normal direction components of the speeds). Therefore, according to equation (1), the desired slit exposure can be achieved even when the scanning speeds $V_a$ and $V_b$ are not always the same. Also, equation (1) holds when there is the relation $V_a = V_b$ between the scanning speeds $V_a$ and $V_b$ as in the case of the first embodiment.

What is claimed is:
1. A scanning exposure device, comprising:
a projection lens for projecting a picture image;
a photosensitive member disposed beneath said projection lens;
a slit disposed adjacent said photosensitive member;
a first movable mirror having its reflecting surface facing at least partially upward towards said projection lens to reflect a light beam projected from said projection lens;
a second movable mirror having its reflecting surface facing at least partially upward towards said projection lens and having an asymmetrical inclination relative to that of said first movable mirror to reflect a light beam reflected from said first movable mirror;
a stationary mirror having its reflecting surface facing at least partially downward to reflect a light beam reflected from said second movable mirror towards said slit; and
a scanning drive mechanism for causing scanning movements of said first and second movable mirrors so that the light beam from said second mov- able mirror exposes the picture image on said photosensitive member through said slit.

2. A scanning exposure device according to claim 1, wherein said scanning drive mechanism additionally causes scanning movement of said photosensitive member.

3. A scanning exposure device according to claim 1, further comprising a carriage carrying said first and second movable mirrors and wherein said scanning drive mechanism moves said carriage to thereby cause said scanning movements.

4. A scanning exposure device according to claim 1, wherein said scanning drive mechanism drives said first and second movable mirrors for scanning movements at different speeds.

* * * * *

UNITED STATES PATENT AND TRADEMARK OFFICE
CERTIFICATE OF CORRECTION

PATENT NO. : 4,864,359

DATED : September 5, 1989

INVENTOR(S) : Teiichi Yamaski et al.

It is certified that error appears in the above-identified patent and that said Letters Patent is hereby corrected as shown below:

On the head sheet at line 73 please insert the name of the Assignee: Fuji Photo Film Co., Ltd.

Signed and Sealed this

Second Day of October, 1990

*Attest:*

HARRY F. MANBECK, JR.

*Attesting Officer*     *Commissioner of Patents and Trademarks*